United States Patent Office 2,890,542
Patented June 16, 1959

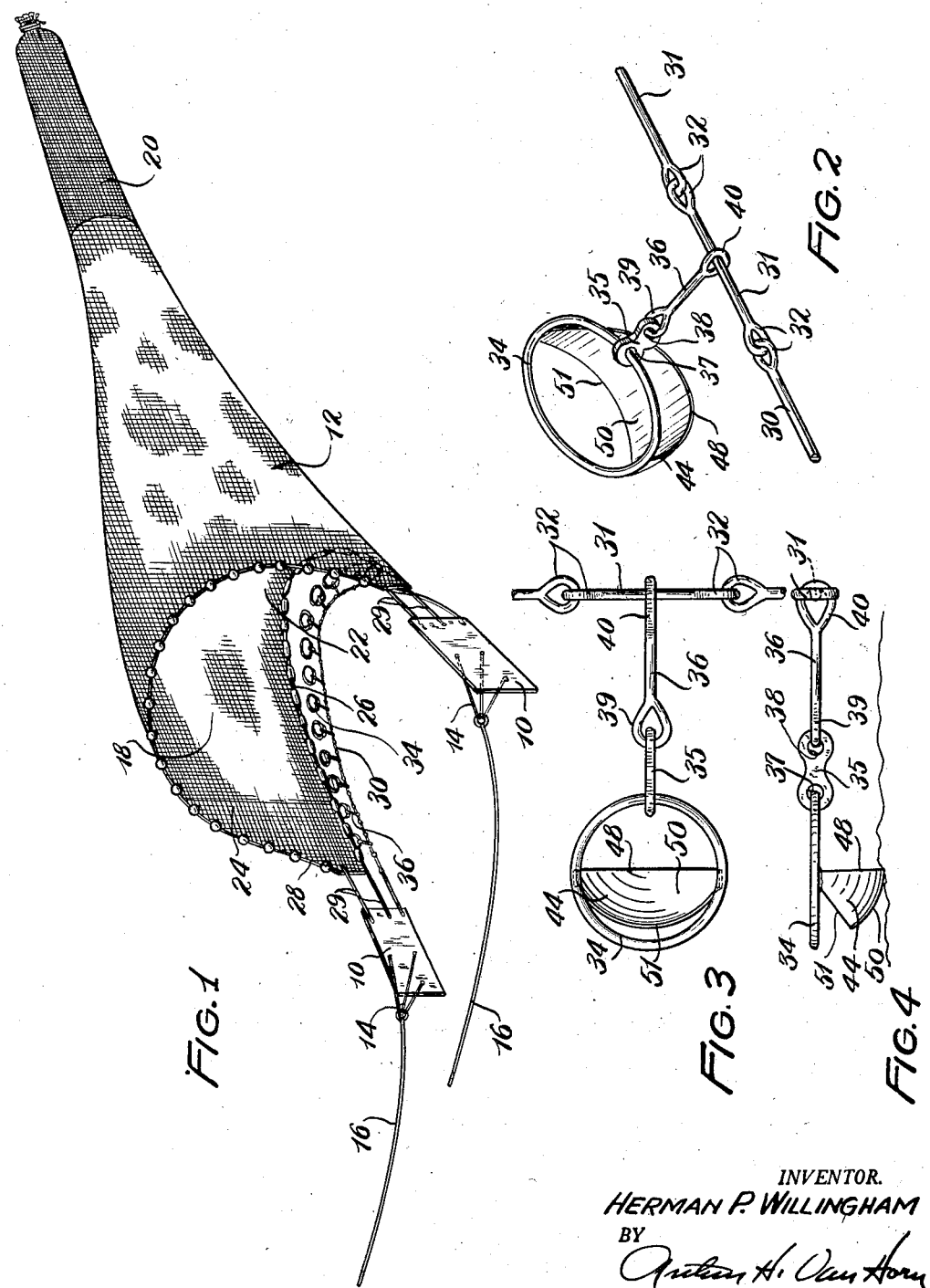

2,890,542

TRAWLING GEAR FOR CATCHING SHRIMP

Herman P. Willingham, Fort Myers, Fla.

Application September 19, 1956, Serial No. 610,822

9 Claims. (Cl. 43—9)

The present invention relates to trawling gear and, more particularly, to trawling gear for catching shrimp.

Shrimp are generally found on the bottom of the ocean in areas which may be termed underwater plains, although small ridges and valleys may be present in the areas. The plains are covered with sedimentary mud or sand underlain with clay and the clay or sand layer may range from several inches to several feet in depth. The shrimp normally lie buried up to a depth of 1½ inches in these areas but at intervals emerge from their burrows to feed and lie on the bottom. The shrimp which are not buried may be caught by dragging a net over the ocean bottom. The disturbance created by the net will cause the shrimp, particularly those which are not buried to jump, giving the moving net the opportunity to trap them. The net is usually provided with a tickler chain to create a disturbance and to scare the shrimp into jumping. The tickler chain is stretched across the net so as to drag over the ocean bottom in advance of the mouth of the net. Many of the shrimp in a given area are passed over by the net since at no time do all shrimp come out of the mud or sand where they conceal themselves, although at certain times during each 24-hour period, more shrimp leave concealment to feed, etc., than at other times. Even during a period when a large number of shrimp have emerged from the bottom to feed, a large percentage remain buried and do not jump when the present nets are dragged over the area and are, therefore, not caught. In addition, the tickler chain will often skip and fail to scare many of the shrimp which are not buried.

The principal object of the present invention is to provide a new and improved trawling gear which is particularly suitable for catching shrimp and which is so constructed that it will tear up the bottom of the area in which it operates in advance of the passage of the mouth of the net, but yet will not hang up on obstructions such as logs and shells or become fouled with seaweed.

Another object of the present invention is to provide in a trawling gear for catching shrimp or fish, a tickler chain having dredges, for tearing up the ocean bottom, connected thereto at spaced intervals and in which the dredges are constructed and supported in such a manner that they will not hang up on obstructions or become fouled with the net of the gear or seaweed and will dig up the bottom to a desired predetermined depth.

A further object of the present invention is to provide a trawling gear as set forth above in which the dredges are each semi-circular in elevation and are spherically curved to form a scoop-like plow member having equal cross sectional areas for receiving and exhausting the sand or mud plowed thereby.

A still further object of the present invention is to provide, in shrimp trawling gear, a new and improved tickler chain which is relatively inexpensive and lightweight but which has the necessary strength and flexibility.

Further objects and advantages of the present invention are apparent in the following description of the preferred embodiment of the present invention made with reference to the accompanying drawing forming a part of this specification for all matter shown therein, whether or not expressly described, and in which Figure 1 is a perspective view of a shrimp trawling gear embodying the present invention;

Figure 2 is a detail view in perspective of a dredge and a portion of the tickler chain to which the dredge is connected and which forms a part of the gear shown in Figure 1;

Figure 3 is a plan view of the dredge and chain shown in Figure 2; and

Figure 4 is a side elevational view of the dredge and chain shown in Figure 3.

Referring to Fig. 1, the shrimp-trawling gear shown therein comprises otter boards 10 to which a funnel-shaped net 12 is connected. The otter boards 10 each have bridle assemblies 14 to which one end of tow cables 16 are tied, the other end of the cables 16 being secured to the fishing craft. The otter boards 10 slide on the ocean bottom as the gear is dragged by the fishing craft and the net 12 is pulled along behind the otter boards.

The funnel-shaped net 12 has a mouth designated by the reference numeral 18, and a tail or "bag" 20 where the fish or shrimp accumulate. The upper part of the net at the mouth 18 overhangs the lower part or belly 22 of the net to form an overhead canopy 24 extending above and forwardly from the lower edge of the belly. The lower edge of the net is connected to a lead line 26 and the upper edge at the outer edge of the overhead canopy is connected to a cork or float line 28. The net is tied to the otter boards by lines 29 which are connected to the net at the ends of the float line 28 and the lead lines 26. The float line and lead line become approximate catenaries when the net is in operation and the float line causes the upper part of the net to float above the bottom while the lead line keeps the belly of the net on the ocean bottom.

The trawling gear as thus far described is of conventional construction well understood by those skilled in the art and, therefore, it has not been described in great detail.

A tickler member or chain 30 for scaring up the shrimp or fish is connected between the otter boards 10. The chain 30 is shorter than the lead line 26 and during trawling operations forms a caternary which drags over the ocean bottom in advance of the lead line. Conventionally the lead line is relied upon to scare the fish or shrimp into jumping from the bottom. The chain 30, in the illustrated and preferred embodiment of the invention, is comprised of a plurality of rod-like links 31 having eyes 32 at the opposite ends thereof which loop through the eyes of the adjacent links. In addition, the chain 30 has a plurality of dredges 33 connected thereto at spaced points therealong for "plowing" the ocean bottom in advance of the mouth of the net.

The dredges 33 each comprise a circular beam or ring 34 connected to a link of the chain 30 by a connecting link 35 and a bar 36. The link 35 has an opening 37 at one end in which the ring 34 is received and an opening 38 at the other end which receives a closed loop 39 at the adjacent end of the bar 36. The bar 36 has a closed loop 40 at its other end which encircles the rod-like portion of the link 31 to which the dredge is connected. The eyes of the links 31 act as stops to limit the shifting movement of the bars 36 and, in turn, the dredges 33 along the chain 30. The loops 39 and 40 lie in horizontal and vertical planes respectively and permit free universal movement of the dredge with respect to the chain.

In addition to the ring 34, the dredges 33 each comprise a cup-shaped scoop member 44 dependingly connected to the ring 34. The crown of each scoop member is lowermost and the ends of the scoop members are connected to the corresponding ring 34 at substantially diametrically opposed points. The leading edge of the scoop members is semi-circular in elevation and lies in a plane perpendicular to the plane of the ring and forms a curved plow edge 48. The portions 50 of scoop members 44 extending from the plow edge 48 to the trailing edge 51 of the scoop members are spherically curved portions and the trailing edges 51 are semi-circular with the same center as plow edge 48. The trailing edge 51 lies in a plane which is at angle with respect to both the plane of the ring 34 and the plane of the plow edge 48. The scoop member 44 in the preferred and illustrated embodiment may be best described as a sector of a hollow sphere which sector is less than a quarter of a sphere and which has its ends connected to the ring 34.

The leading and trailing edges 48, 51 define substantially equal intake and exhaust areas for the plowed material and the upwardly curved nature of the portion between the plow edge 48 and the trailing edge causes the plowed material to be directed upwardly toward the overhead canopy of the net in the path of the mouth of the net.

The dredges 33 will automatically seek a depth where the pull from the tickler chain 30 through the bar 38 and connecting link 35 is a horizontal pull and the plow edges of the scoop members lie in vertical planes. The depth of plowing is determined, therefore, by the depth of the scoop members 44. If the scoop members 44 should strike an obstruction, they may "side-step" the obstruction since they are free to shift sideways 180° along the ring 34 with respect to the connecting link 35 and may swing through even a greater arc by reason of the universal type connection between the connecting link 35 and the bar 38. It is apparent that the dredges are also free to swing upwardly if necessary to pass over an obstruction. In addition, the smooth curved lines of the dredges 33 enable the dredges to perform their function without danger of fouling with the net or with seaweed. Apart from their function of plowing up the ocean bottom, the dredges 33 also hold the tickler chain against skipping.

It can now be seen that the objects heretofore enumerated and others have been accomplished and that a new and improved trawling gear has been provided in which dredges are connected to a tickler chain for scaring up fish or shrimp and are so constructed and arranged that they scoop up the ocean bottom in advance of the trawl net and direct the scooped material upwardly toward the mouth of the trawl net. The dredges are constructed so as to plow to a predetermined depth and are shaped and supported so as to prevent fouling and hanging up on obstructions.

While the preferred embodiment of the present invention has been described in detail, it is hereby my intention to cover all modifications, constructions and arrangements which fall within the ability of those skilled in the art and the scope of the appended claims.

I claim:

1. In trawling gear for catching shrimp which comprises a net and a flexible tickler member supported and extending transversely and in advance of the net mouth lower forward edge but rearwardly of the top edge of the net mouth to drag on the ocean bottom, dredge members connected to the tickler member at spaced intervals for scooping the bottom and directing the scooped material upwardly into the net, said dredge members having intake and exhaust areas for the plowed material which are substantially equal.

2. In trawling gear for catching shrimp which comprises a net and a flexible tickler member supported and extending transversely and in advance of the net mouth lower forward edge but rearwardly of the top edge of the net mouth to drag on the ocean bottom, dredge members connected to the tickler member at spaced intervals for scooping the bottom and directing the scooped material upwardly into the net, said dredges comprising a cup-like scoop member having a curved plow edge lying in a plane extending transversely to the direction of movement of the member and a curved scoop portion extending rearwardly and upwardly from the plow edge to direct the plowed material in an upward direction.

3. In trawling gear for catching shrimp which comprises a net and a flexible tickler member supported and extending transversely and in advance of the net mouth lower forward edge but rearwardly of the top edge of the net mouth to drag on the ocean bottom, dredge members connected to the tickler member at spaced intervals for scooping the bottom and directing the scooped material upwardly into the net and having leading and trailing edges defining intake and exhaust areas for the plowed material, said edges defining circular arcs.

4. In trawling gear for catching shrimp which comprises a net and a flexible tickler member supported and extending transversely and in advance of the net mouth lower forward edge but rearwardly of the top edge of the net mouth to drag on the ocean bottom, dredge members connected to the tickler member at spaced points therealong for scooping the bottom and directing the scooped material upwardly into the net, and having leading and trailing arcuate edges defining equal entrance and exhaust areas for the plowed material.

5. In trawling gear for catching shrimp which comprises a net and a flexible tickler member supported and extending transversely and in advance of the net mouth lower forward edge but rearwardly of the top edge of the net mouth to drag on the ocean bottom, dredge members connected to the tickler member at spaced points therealong for scooping the bottom and directing the scooped material upwardly into the net, and having arcuate leading and trailing edges defining equal entrance and exhaust areas for the plowed material with the leading edge being in a vertical plane and the trailing edge being in an upwardly facing plane, said edges having the same center of curvature.

6. In trawling gear for catching shrimp which comprises a net and a tickler member supported to drag on the ocean bottom in advance of the lower forward edge of the mouth of the net, dredge members connected to the tickler member at spaced points therealong for scooping the bottom and directing the scooped material upwardly, and having circular leading and trailing edges defining entrance and exhaust areas for the plowed material, said edges being joined by a spherically curved surface.

7. In trawling gear for catching shrimp which comprises a net and a tickler member supported to drag on the ocean bottom in advance of the lower forward edge of the mouth of the net, dredge members connected to the tickler member at spaced points therealong for scooping the bottom and directing the scooped material upwardly, and having equal intake and exhaust areas for the plowed material defined by circular leading and trailing edges with the leading edge being in a vertical plane and the trailing edge in an upwardly facing plane, said edges having the same center of curvature and being joined by a spherically curved scoop portion.

8. In trawling gear for catching shrimp and which comprises a net adapted to be dragged along the ocean bottom and a flexible tickler member supported across the mouth of the net for substantially the entire width thereof to drag the bottom in advance of the mouth of the net, a plurality of dredge members adapted to bite into the ocean bottom, each of said members having a horizontal arcuate beam connected to its upper end, and means connecting said dredge members to said tickler member comprising a connecting member having an opening for freely receiving said beam, said dredge members each comprising a cup-shaped scoop member connected at its opposite ends to said beam and depending therefrom.

9. In trawling gear for catching shrimp and which comprises a net adapted to be dragged along the ocean bottom and a flexible tickler member supported across the mouth of the net for substantially the entire width thereof to drag the bottom in advance of the mouth of the net, a plurality of dredge members adapted to bite into the ocean bottom, each of said members having a horizontal arcuate beam connected to its upper end, and means connecting said dredge members to said tickler member comprising a connecting member having an opening for freely receiving said beam, said dredge members each comprising a spherically curved cup-shaped member having its opposite ends connected to said beam so as to depend therefrom.

References Cited in the file of this patent

UNITED STATES PATENTS

| | | |
|---|---|---|
| 289,612 | Bollermann | Dec. 4, 1883 |
| 379,422 | Smith | May 13, 1888 |
| 1,387,590 | Collier | Aug. 16, 1921 |
| 1,600,839 | Mudge | Sept. 21, 1926 |

FOREIGN PATENTS

| | | |
|---|---|---|
| 2,906 | Great Britain | Nov. 26, 1860 |
| 24,235 | Germany | Apr. 23, 1914 |